(12) United States Patent
Guo (10) Patent No.: US 9,407,148 B2
(45) Date of Patent: Aug. 2, 2016

(54) MULTI-PHASE SMPS WITH LOOP PHASE CLOCKS AND CONTROL METHOD THEREOF

(71) Applicant: Monolithic Power Systems, Inc., San Jose, CA (US)

(72) Inventor: Yanchuan Guo, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 170 days.

(21) Appl. No.: 14/230,381

(22) Filed: Mar. 31, 2014

(65) Prior Publication Data

US 2015/0280560 A1    Oct. 1, 2015

(51) Int. Cl.
*G05F 1/00* (2006.01)
*H02M 3/158* (2006.01)

(52) U.S. Cl.
CPC .... *H02M 3/1584* (2013.01); *H02M 2003/1586* (2013.01)

(58) Field of Classification Search
CPC . H02M 3/1588; H02M 3/1584; H02M 3/156; H02M 3/157
USPC .................................. 323/271, 272, 282–285
See application file for complete search history.

(56) References Cited

U.S. PATENT DOCUMENTS

| 6,222,745 B1* | 4/2001 | Amaro | H02M 3/157 323/285 |
| 6,879,138 B2* | 4/2005 | Dinh | H02M 3/1584 323/284 |
| 7,023,188 B1* | 4/2006 | Rice | H02M 3/285 323/271 |
| 7,898,233 B2* | 3/2011 | Sato | H02M 3/1584 323/283 |
| 2011/0025284 A1 | 2/2011 | Xu | |
| 2013/0307498 A1 | 11/2013 | Jiang | |
| 2013/0307503 A1 | 11/2013 | Ouyang | |
| 2013/0342176 A1 | 12/2013 | Yang | |
| 2014/0167833 A1 | 6/2014 | Jiang et al. | |

* cited by examiner

*Primary Examiner* — Nguyen Tran
(74) *Attorney, Agent, or Firm* — Perkins Coie LLP (57) ABSTRACT

A multi-phase SMPS has N switching circuits; a setting signal generator generating a setting signal based on an output signal of the SMPS; a clock signal generator generating a system clock signal; and a controller receiving the setting signal and the system clock signal, the controller generating N shifted phase clock signals according to the system clock signal, and the N shifted phase clock signals forming loop phase clocks, and the controller further generates N switching control signals based on the setting signal and the N shifted phase clock signals.

20 Claims, 8 Drawing Sheets

MULTI-PHASE SMPS WITH LOOP PHASE CLOCKS AND CONTROL METHOD THEREOF

TECHNICAL FIELD

The present invention generally relates to electrical circuit, and more particularly but not exclusively relates to multi-phase switching mode power supply with loop phase clocks.

BACKGROUND

Switching Mode Power Supply (SMPS) is widely used to convert an input voltage to an output voltage for supplying a load such as a computer or a mobile phone. The output voltage is usually regulated by controlling a duty cycle of a Pulse Width Modulation (PWM) signal that is supplied to a control end of a switch of the SMPS. A multi-phase SMPS comprises a plurality of switching circuits and has a high current carrying ability. Besides, digital PWM signal generator has advantages of strong communication ability and high anti-disruption ability and thus is favored in many applications. Digital control in multi-phase SMPS with fast transient response as well as simple fabrication technology is desired.

SUMMARY

In one embodiment, a multi-phase SMPS comprises: N switching circuits, each switching circuit comprising a switch, wherein the N switching circuits are coupled to an output terminal configured to provide an output voltage for supplying a load, where N is a natural number greater than 1; a setting signal generator having an input coupled to the output terminal and having an output configured to provide a setting signal, wherein the setting signal is generated according to a feedback signal indicative of an output signal at the output terminal; a clock signal generator having an output configured to provide a system clock signal; and a controller having a first input coupled to the output of the setting signal generator configured to receive the setting signal, a second input coupled to the output of the clock signal generator configured to receive the system clock signal, and N outputs configured to provide N switching control signals, wherein each of the respective switching control signals is configured to control a corresponding switching circuit of the N switching circuits, and wherein the controller is configured to generate N shifted phase clock signals according to the system clock signal, and wherein the N shifted phase clock signals have the same frequency with the system clock signal and form a set of loop phase clocks, and further wherein the N switching control signals are generated based on the setting signal and the N shifted phase clock signals.

In another embodiment, a controller for controlling a multi-phase SMPS has: a first input configured to receive a setting signal; a second input configured to receive a system clock signal; and N outputs configured to provide N switching control signals; wherein the multi-phase SMPS comprises N switching circuits coupled to an output terminal configured to provide an output voltage for supplying a load, and each switching circuit comprises a respective switch; and wherein the controller is configured to generate N shifted phase clock signals according to the system clock signal, and wherein the N shifted phase clock signals have the same frequency with the system clock signal and the N shifted phase clock signals forming a set of loop phase clocks, and further wherein each switching control signal is configured to be generated at least based on the setting signal and a corresponding shifted phase clock signal and to control the corresponding switch, where N is a natural number greater than 1.

In yet another embodiment, a method of controlling a multi-phase SMPS comprises: generating N shifted phase clock signals from a system clock signal, wherein the shifted phase clock signals have the same frequency with the system clock signal and form a set of loop phase clocks, and where N is natural number greater than 1; and generating N switching control signals based on the N shifted phase clock signals, wherein each switching control signal transits from a first logic state to a second logic state when a corresponding shifted phase clock signal samples a setting signal in an effective state, and the switching control signal transits from the second logic state to the first logic state after a period of time.

The multi-phase SMPS, the controller and associated control method in embodiments of the present invention may have advantages of low system clock frequency with short reaction time and high resolution, low power consumption, small area and less chip process requirement.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments. These drawings are not necessarily drawn to scale.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Several embodiments of the present invention are described below with reference to multi-phase SMPS, controller and associated control method. As used hereinafter, the term "couple" generally refers to multiple ways including a direct connection with an electrical conductor and an indirect connection through intermediate diodes, resistors, capacitors, and/or other intermediaries.

Figure 1:
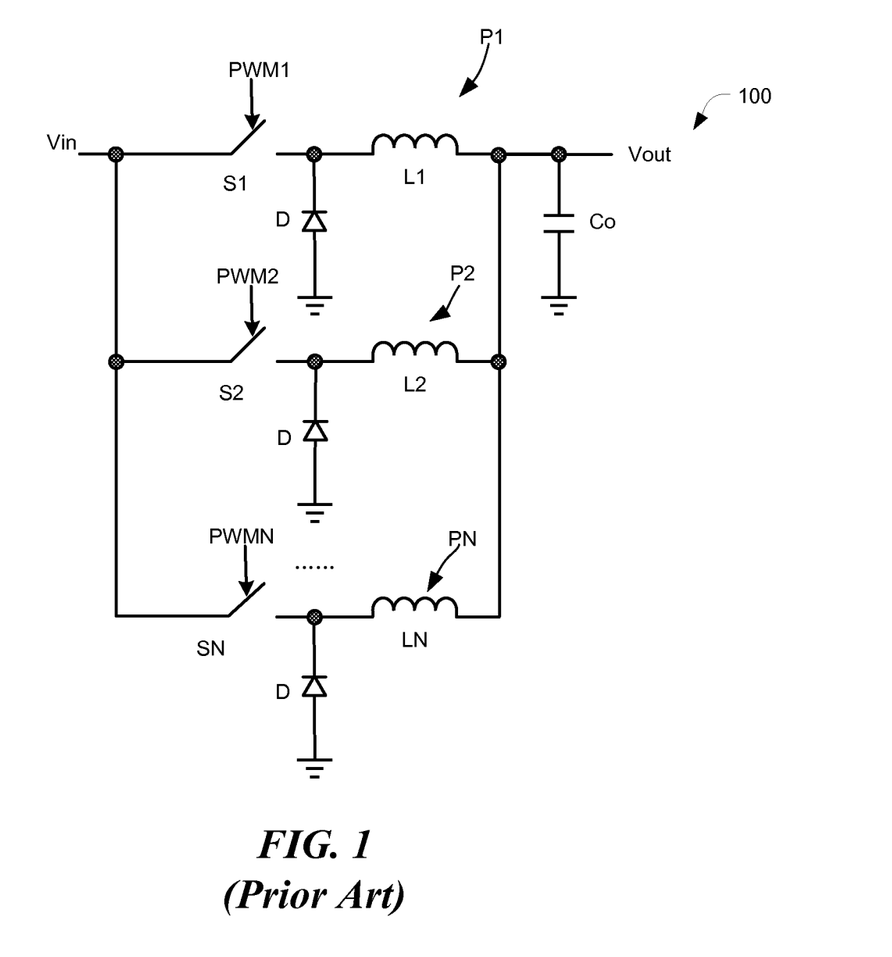
FIG. 1 shows a schematic diagram of an exemplary prior art multi-phase SMPS system 100.

FIG. 1 shows a schematic diagram of an exemplary prior art multi-phase SMPS 100. Multi-phase SMPS 100 has an input terminal Vin receiving an input voltage and has an output terminal Vout providing an output voltage for supplying a load. Multi-phase SMPS 100 comprises a plurality of switching circuits P1-PN, where N is a natural number higher than 1. Each switching circuit Pn (n=1, 2 . . . N) comprises a switch Sn, and the N switches S1-SN are turned ON and OFF one by one with a pattern controlled by a plurality of switching control signals PWM1-PWMN. By controlling the duty cycles of switching control signals PWM1-PWMN, output voltage Vout is regulated. N switching circuits P1-PN multiply the output current by N times, thus multi-phase SMPS system 100 have a high output current. When a PWM signal PWMn (n=1, 2 . . . N) is in a first logic state for example in logic LOW, the corresponding switch Sn is turned off, and when switching control signal PWMn is in a second logic state of logic HIGH, switch Sn is turned on. Switching control signals PWM1-PWMN turn on and off switches S1-SN in sequence to have a smooth output current. A smooth output current would cause little current ripple and allow for a small output capacitor Co. Thus, switching control signals PWM1-PWMN transit from the first logic state to the second logic state in sequence.

In one approach, a digital part runs on one fast system clock signal to sample a setting signal from an analog part. After calculation, the digital part generates the plurality of switching control signals. Switching control signals PWM1-PWMN may be triggered to logic HIGH in sequence at each pulse of a system clock signal. The smallest digital reaction time of switching control signals PWM1-PWMn in this approach equals a cycle period of the system clock signal and is limited by the frequency of the system clock signal. In order to have a fast transient response, a high frequency system clock signal is required. However, high frequency clock signal demands high chip process technology requirement, consumes large area, and leads to high power consumption. Accordingly, an improved method is desired to achieve high resolution with a relatively low frequency oscillator.

Figure 2:
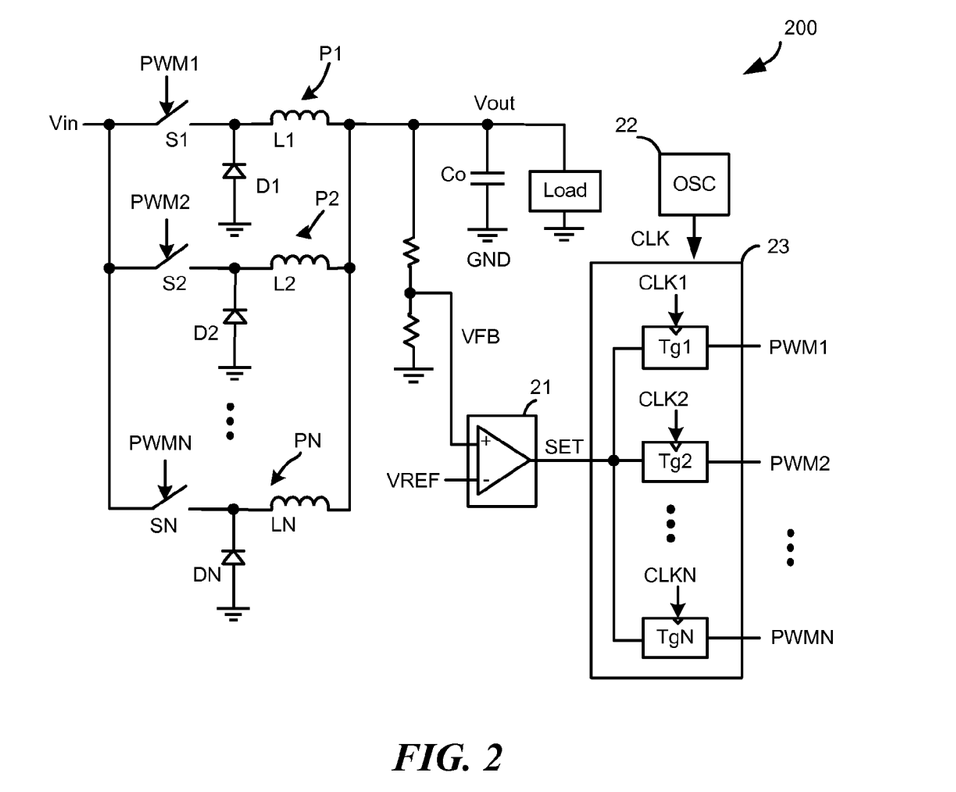
FIG. 2 illustrates a multi-phase SMPS 200 according to an embodiment of the present invention.

FIG. 2 illustrates a multi-phase SMPS 200 according to an embodiment of the present invention. SMPS 200 has an input terminal Vin and an output terminal Vout, where the input terminal Vin receives an input voltage and the output terminal Vout provides an output voltage for supplying a load. SMPS 200 comprises N switching circuits P1-PN, a setting signal generator 21, a clock signal generator 22 (OSC) and a controller 23. Where N is a natural number higher than 1. In general, controller 23 generates a plurality of switching control signals PWM1-PWMN according to a setting signal SET and a system clock signal CLK for controlling switching circuits P1-PN such that the switches S1-SN in switching circuits P1-PN are turned on and off in sequence. Where, controller 23 generates N shifted phase clock signals CLK1-CLKN according to a system clock signal CLK and the N shifted phase clock signals CLK1-CLKN form a set of loop phase clocks. And each control generators Tgn (n=1, 2 . . . N) in controller 23 runs on a corresponding shifted phase clock signal CLKn to sample setting signal SET for generating the corresponding switching control signal PWMn.

Each switching circuit Pn comprises a switch Sn (n=1, 2 . . . N). SMPS 200 converts the input voltage at input terminal Vin to the output voltage at output terminal Vout by controlling the switching actions of switches S1-SN. In detail, each switching circuit Pn comprises a switch Sn coupled between the input terminal Vin and a switching terminal, a rectifier Dn coupled between the switching terminal and a reference ground GND, and an inductor Ln coupled between the switching terminal and the output terminal Vout. In the shown embodiment, each switching circuit Pn is in buck topology. However, it should be known that the switching circuits may be in other topologies such as boost topology, buck-boost topology, etc. Multi-phase SMPS 200 further comprises an output capacitor Co coupled between the output terminal Vout and the reference ground GND.

Setting signal generator 21 has an input coupled to the output terminal Vout of SMPS 200 for receiving a feedback signal VFB indicative of an output signal at the output terminal Vout, and has an output providing setting signal SET for generating the switching control signals PWM1-PWMN. In the shown embodiment, feedback signal VFB is indicative of the output voltage at the output terminal Vout. Thus SMPS 200 may further comprise a feedback circuit comprises a resistor divider for generating feedback signal VFB. However in other embodiments, feedback signal VFB supplied to setting signal generator 21 can be other types of signal, such as output current feedback signal or output power feedback signal.

In one embodiment as shown in FIG. 2, setting signal generator 21 comprises a comparing circuit. Comparing circuit 21 has a first input which receives the feedback signal VFB, has a second input which receives a reference signal VREF, and has an output which provides setting signal SET. When the feedback signal VFB is higher than the reference signal VREF, for example, when the output current is lower than a threshold, setting signal SET is in an effective state, and when feedback signal VFB is lower than the reference signal VREF, setting signal SET is in an ineffective state. However, setting signal generator 21 may comprise other circuit in order to get a setting circuit based on the output signal at output terminal Vout.

Clock signal generator 22 provides the system clock signal CLK. In one embodiment, clock signal generator 22 comprises an oscillator.

Controller 23 receives setting signal SET and system clock signal CLK, and generates N switching control signals PWM1-PWMN for controlling switches S1-SN. In one embodiment, controller further generates another N control signals for controlling N synchronous rectifiers. Each switching control signal PWMn (n=1, 2 . . . N) controls a corresponding switch Sn. Controller 23 generates N shifted phase clock signals CLK1-CLKN according to the system clock signal CLK. The N shifted phase clock signals CLK1-CLKN have the same frequency with the system clock signal CLK, and form loop phase clocks. That is, each of the shifted phase clock signals CLK1-CLKN are generated from system clock signal CLK by shifting a fixed degree phase, thus the phases of shifted phase clock signals CLK1-CLKN are fixed in one cycle according to system clock signal CLK and form a set of loop phase clocks. Switching control signals PWM1-PWMN provided by N outputs of controller 23 are generated according to the setting signal SET and the N shifted phase clock signals CLK1-CLKN. In one embodiment, N shifted phase clock signals CLK1-CLKN are used for synchronizing the setting signal SET. In a preferred embodiment, controller 13 comprises a digital part, and each of setting signal generator 21 and clock signal generator 22 comprises an analog part.

Figure 3:
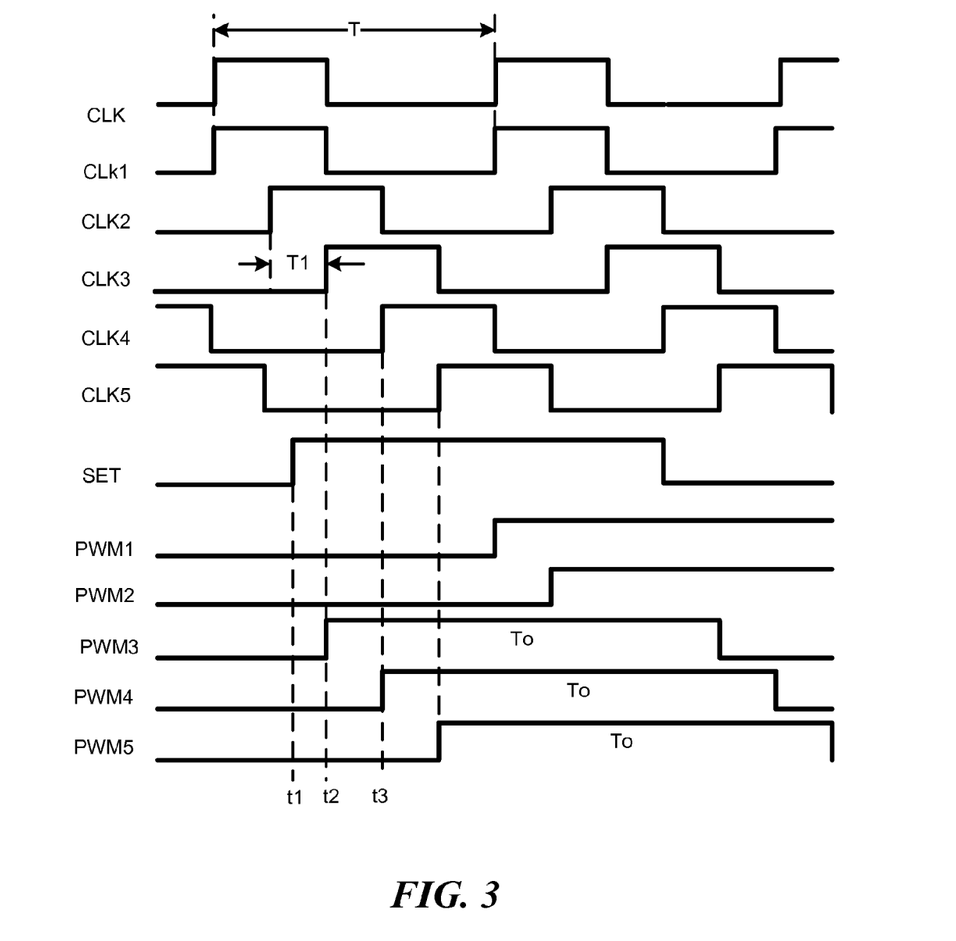
FIG. 3 illustrates a waveform diagram of several signals with reference to FIG. 2 according to an embodiment of the present invention.

FIG. 3 illustrates a waveform diagram of several signals with reference to FIG. 2 according to an embodiment of the present invention. The system clock signal CLK has a cycle period of T. In the shown embodiment, a SMPS comprises 5 switching circuits (N=5). Shifted phase clock signals CLK1-CLK5 are generated from system clock signal CLK, have the same frequency and same waveform shape with system clock signal CLK, but have different fixed phases and form a set of loop phase clocks, for example, for a 5-phase SMPS, the phases for 5 shifted phase clock signals are 0°, 72°, 144°, 216° and 288° or 0°, 60°, 150°, 200° and 300°; for a 6-phase SMPS, the phases for 6 shifted phase clock signals are 0°, 60°, 120°, 180°, 240°, 300°; or for a 10-phase SMPS, the phases for 10 shifted phase clock signals are 0°, 36°, 72°, 108°, 144°, 180°, 216°, 252°, 288°, and 324°. In a preferred embodiment, the phase differences between each two adjacent shifted phase clock signals are the same. For example, the phases for shifted phase clock signals CLK1-CLK5 in FIG. 3 are 0°, 72°, 144°, 216° and 288° respectively. In one embodiment, one shifted phase clock signal CLK1 has the same phase with the system clock signal CLK. The system clock signal CLK and N−1 shifted phase clock signal may form loop phase clocks.

At time t1, setting signal SET transits from ineffective state of logic LOW to effective state of logic HIGH. And at this time, the closest shifted phase clock signal is CLK3. At time t2, shifted phase clock signal CLK3 transits from logic LOW state to logic HIGH state, and switching control signal PWM3 transits from logic LOW state to logic HIGH state for turning on switch S3 in the third switching circuit P3. Or in other words, a switching control signal may transit from a first logic state to a second logic state by sampling the setting signal with the corresponding shifted phase clock signal. At time t3, shifted phase clock signal CLK4 transits from logic LOW state to logic HIGH state, and switching control signal PWM4 transits from logic LOW state to logic HIGH state for turning on switch S4 in switching circuit P4. Thus the smallest digital reaction time for generating switching control signals PWM1-PWM5 is time period T1 which is 1/5 of cycle period T of system clock signal CLK. Accordingly, the resolution which is determined by the smallest digital reaction time according to this embodiment is 5 times high the resolution in the approach whose resolution is determined by cycle period T of the system clock signal. For a multi-phase SMPS which has N switching circuits, the resolution is N times of that in the approach whose resolution is determined by cycle period T of the system clock signal. Thus for a predetermined desired resolution, the system clock frequency of a multi-phase SMPS which comprises N switching circuits according to an embodiment of the present invention is 1/N of the frequency in the approach whose resolution is determined by cycle period T of the system clock signal, and thus the system clock signal generator according to embodiments of the present invention can be fabricated with simpler process technology and have lower fabrication cost. Also, the power consumption is much lower according to embodiments of the present invention.

The logic HIGH state of each PWM signal remains for a time period To. In one embodiment, on time period To=M*T, where M is a natural number and T indicates the cycle period of the system clock signal. In one embodiment, time period To indicates the on time period of the corresponding switch. And in another embodiment, time period To indicates the off time period of the corresponding switch.

In another embodiment, on time period To=(M+x/N)*T, where M is a natural number, x represents a natural number less than N, and N is the phase number or the number of switching circuits of the multi-phase SMPS. Where the time portion of M*T is determined by the corresponding shifted phase clock signal CLKn, and the time portion of x/N*T is determined by another shifted phase clock signal CLK(n+x).

It is noted that the same labels of t1-t3 in different drawings denote irrelevant time points, but only for illustrating the time sequences in respective drawings.

Figure 4:
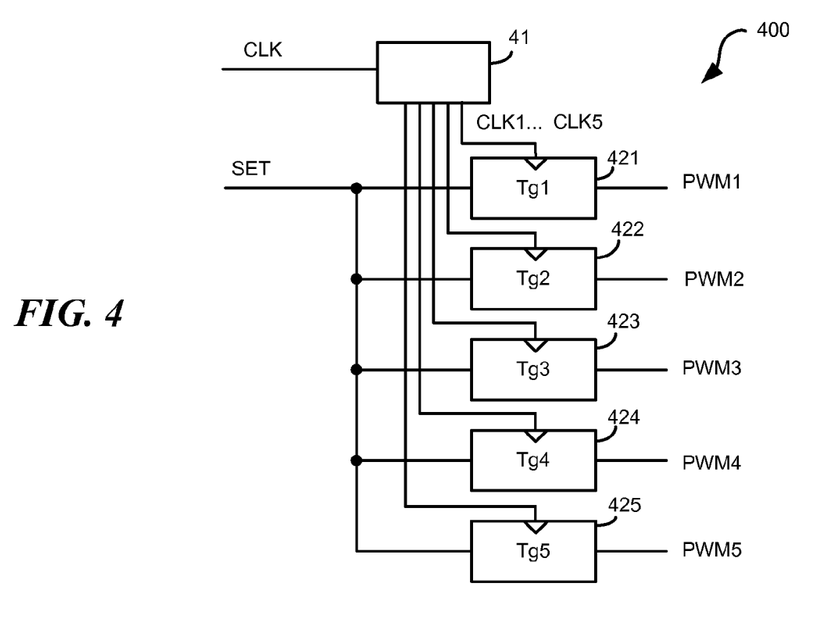
FIG. 4 illustrates a controller 400 of a multi-phase SMPS for generating a plurality of switching control signals according to an embodiment of the present invention.

FIG. 4 illustrates a controller 400 for generating a plurality of switching control signals according to an embodiment of the present invention. For this embodiment, the SMPS system comprises 5 switching circuits and 5 switching control signals PWM1-PWM5 are required. It is noted that the number of switching circuits are only for illustration and any natural number higher than 1 is possible. Controller 400 comprises loop phase circuit 41 and 5 control signal generators 421-425. Loop phase circuit 41 has an input coupled to the system clock signal generator to receive the system clock signal CLK, and has 5 outputs providing 5 shifted phase clock signals CLK1-CLK5 which form a set of loop phase clocks. The phases of the shifted phase clock signals are divided preferably with even intervals in a cycle according to the system clock signal CLK by loop phase circuit 41. Thus shifted phase clock signals CLK1-CLK5 preferably have degree phases of 0°, 72°, 144°, 216° and 288° as shown in FIG. 3.

A first control signal generator 421 (Tg1) has a first input receiving a setting signal SET, has a second input receiving the first shifted phase clock signal CLK1, and has an output providing a first switching control signal PWM1. The first switching control signal PWM1 is generated according to setting signal SET and the first shifted phase clock signal CLK1. When setting signal SET is in effective state and when the first shifted phase clock signal CLK1 transits from a first state to a second state, the first switching control signal PWM1 transits from a first logic state to a second logic state to turn on the first switch S1. And after a predetermined on time period, the first switching control signal PWM1 transits from the second logic state to the first logic state to turn off the first switch S1. Similarly, a second control signal generator 422 (Tg2) receives setting signal SET and the second shifted phase clock signal CLK2, and provides a second switching control signal PWM2. And so on.

In another embodiment, the loop phase circuit has N−1 outputs, and for a 5-phase SMPS has 4 outputs to provide 4 shifted phase clock signals which have phases of 72°, 144°, 216° and 288° in view of phase 0° of the system clock signal. Thus the system clock signal and the shifted phase clock signals form a set of loop phase clocks. The system clock signal is supplied to the first control signal generator, and the shifted phase clock signals are supplied to the rest control signal generators.

Figure 5:
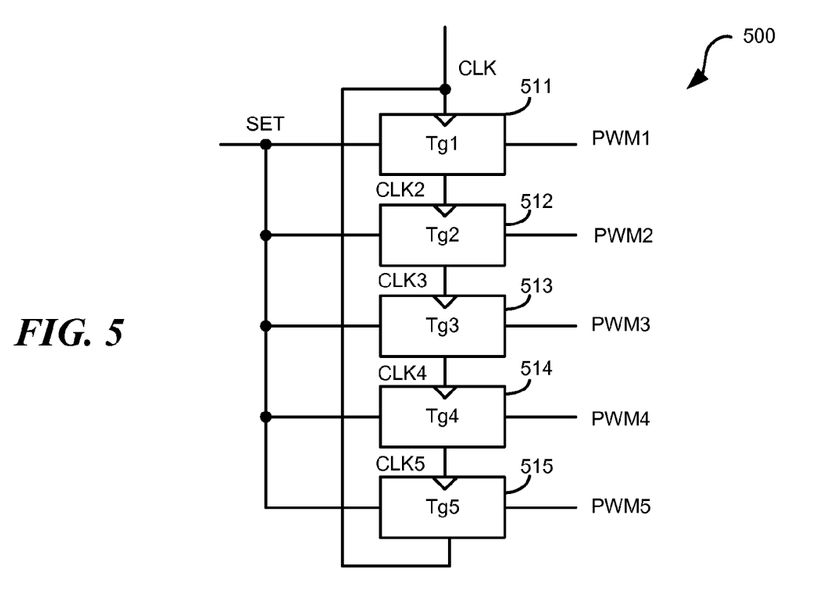
FIG. 5 illustrates a controller 500 according to another embodiment of the present invention.

FIG. 5 illustrates a controller 500 according to another embodiment of the present invention. Controller 500 is used in a 5-phase SMPS system. Controller 500 comprises 5 control signal generators 511-515. The first control signal generator 511 (Tg1) has a first input receiving a setting signal SET, has a second input receiving a system clock signal CLK, has a first output providing the first switching control signal PWM1, and has a second output providing a shifted phase clock signal CLK2 supplied to the second control signal generator 512 (Tg2). The shifted phase clock signal CLK2 is shifted according to clock signal CLK with a delayed phase. Switching control signal PWM1 is generated according to setting signal SET and clock signal CLK. When setting signal SET is in effective state and clock signal CLK transits from ineffective state to effective state, the first switching control signal PWM1 transits from a first logic state to a second logic state to turn on the first switch S1. And after a predetermined on time period, the first switching control signal PWM1 transits from the second logic state to the first logic state. Similarly, the second control signal generator 512 receives setting signal SET and the second shifted phase clock signal CLK2, and provides a second switching control signal PWM2 and a shifted phase clock signal CLK3 with a shifted phase according to clock signal CLK2. And so on. The fifth control signal generator 515 has a first output providing a switching control signal PWM5 and has a second output coupled to the second input of the first control signal generator 511 to make sure that clock signals CLK, CLK2-CLK5 form loop phase clocks.

In one embodiment, the switching control signal may configure to turn off the corresponding switch when the setting signal is in an effective state and the corresponding shifted phase clock signal transits from an ineffective state to an effective state, and then configured to turn on the switch after a predetermined off time period.

In one embodiment, a control signal generator may comprise a trigger which transits the corresponding switching control signal from a first logic state to a second logic state when both the setting signal is in an effective state and the corresponding shifted phase clock signal transits from an ineffective state to an effective state. And the trigger comprises a timer internally, and the timer starts to count once the switching control signal is in the second logic state. The timer adds on 1 at each pulse of a corresponding shifted phase clock signal. And when the number reaches a predetermined number, the timer overflows and the switching control signal transits from the second logic state to the first logic state.

Figure 6:
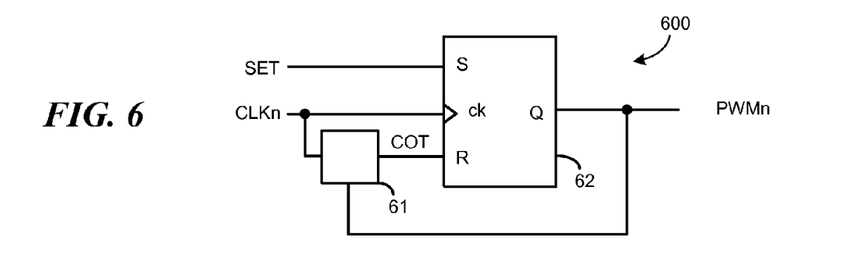
FIG. 6 illustrates a control signal generator 600 of a controller according to an embodiment of the present invention.

FIG. 6 illustrates a control signal generator 600 (Tgn) according to an embodiment of the present invention. Control signal generator 600 comprises an on time signal generator 61 and an RS flip-flop 62. RS flip-flop 62 has a setting input S, a resetting input R and a timing input ck, where the setting input S receives a setting signal SET, the resetting input R receives an on time control signal COT, and timing input ck receives the corresponding shifted phase clock signal CLKn. When setting signal SET is in effective state of logic HIGH, and shifted phase clock signal CLKn transits from logic LOW to logic HIGH, switching control signal PWMn transits from logic LOW to logic HIGH to turn on the corresponding switch Sn. Switching control signal PWMn transits from logic HIGH to logic LOW after an on time period indicated by on time control signal COT. On time signal generator 61 has a first input coupled to the output of RS flip-flop 62 to receive the switching control signal PWMn, has a second input receiving a shifted phase clock signal CLKn, and provides on time control signal COT for controlling the on time period of switching control signal PWMn. In one embodiment, on time signal generator 61 comprises a timer, when switching control signal PWMn transits from logic LOW to logic HIGH, the timer starts to count, and on time control signal COT transits from logic HIGH to logic LOW. The timer counts and increases by 1 at each pulse of shifted phase clock signal CLKn. When the counted number reaches a predetermined number M, timer 61 overflows and on time control signal COT transits from logic LOW to logic HIGH to reset switching control signal PWMn and to turn off the corresponding switch Sn. Thus on time period To indicated by on time control signal COT is Ton=M*T. Where M is a predetermined natural number and T represents the cycle period of clock signal CLKn which has the same cycle period with the system clock signal. In one embodiment, the setting signal is coupled to the resetting input and the on time control signal COT is coupled to the setting input. In one embodiment, on time signal generator 61 further receives the output voltage and input voltage of the SMPS and provides the on time period Ton based on the output voltage and the input voltage. Thus, number M may be calculated from the input voltage and the output voltage of the multi-phase SMPS.

Figure 7:
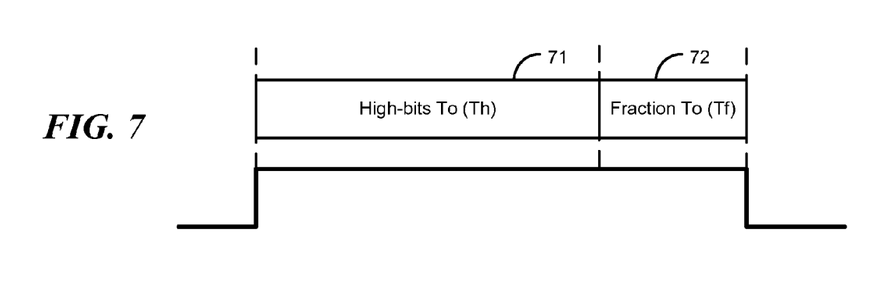
FIG. 7 illustrates an on time period control according to an embodiment of the present invention.

FIG. 7 illustrates an on time period control of a multi-phase SMPS according to an embodiment of the present invention. In this embodiment, the on time period comprises a high-bits on time period 71 and a fractional on time period 72. The high-bits on time period 71 is Th=M*T, where M is a natural number and T is the cycle period of the system clock signal. The fractional on time period 72 is Tf=x/N*T, where x is a natural number less than N, and N is the total number of switching circuits in a multi-phase SMPS. And time period To of a switching control signal PWMn is To=Th+Tf=(M+x/N) *T. The high-bits on time period Th is derived from the shifted phase clock signal CLKn of the selected clock phase and the fractional on time period Tf is derived from another shifted phase clock signal CLK(n+x) of other clock phase. In one embodiment, on time period To is controlled by the input voltage and the output voltage of the multi-phase SMPS, and a switching network maybe configured to select the desired second shifted phase clock signal CLK(n+x). In this embodiment, the resolution of the on time period is increased to N times of the resolution in a tradition one and thus the resolution of time period control is also increased.

Figure 8:
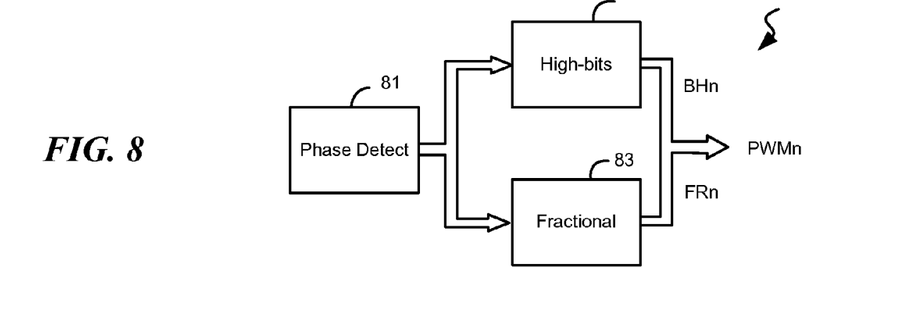
FIG. 8 illustrates a block diagram of a control signal generator 800 according to an embodiment of the present invention.

FIG. 8 illustrates a block diagram of a control signal generator 800 according to an embodiment of the present invention. Control signal generator 800 comprises a phase detection module 81, a high-bits control signal generator 82 and a fractional control signal generator 83. Phase detection module 81 detects the setting signal and determine which shifted phase clock signal is the closest one, and to turn on the corresponding switch. And at the meantime, to trigger high-bits control signal generator 82 start counting. High-bits control signal generator 82 provides a high-bits control signal BHn. Fractional control signal generator 83 provides a fractional control signal FRn according to the phase detection module 81, and switching control signal PWMn is generated according to the high-bits control signal BHn and the fractional control signal FRn.

Figure 9A:
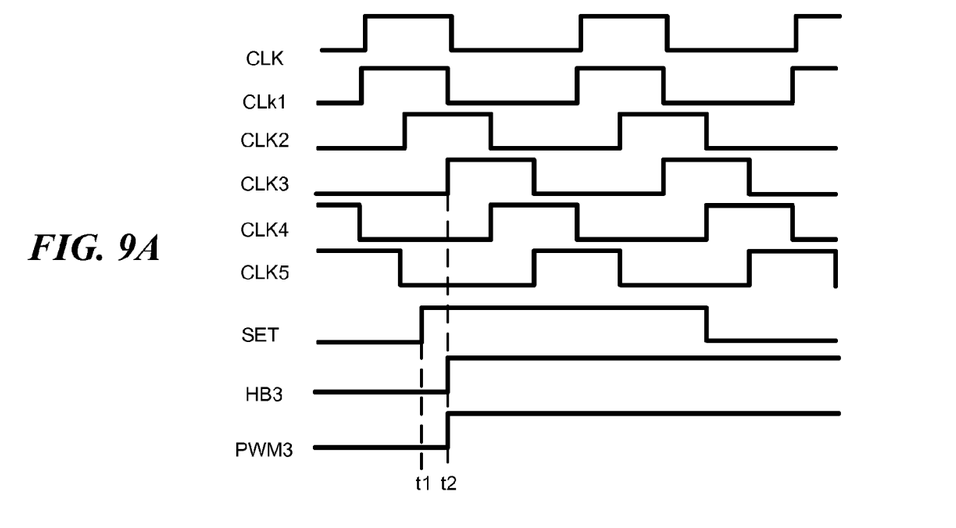
FIGS. 9A and 9B illustrate two waveform diagrams to illustrate the generation of a switching control signal according to an embodiment of the present invention.
Figure 9B:
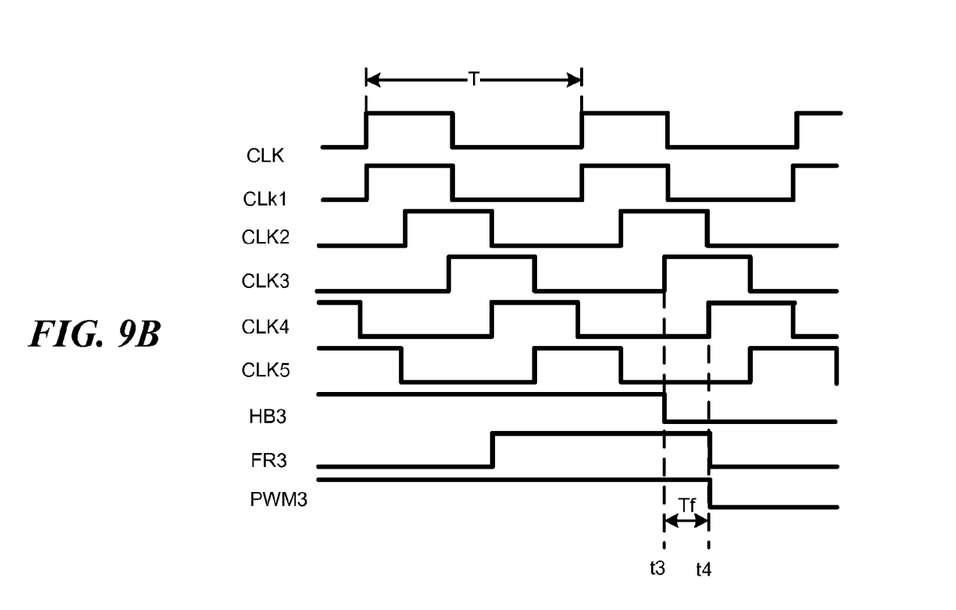

FIGS. 9A and 9B illustrate two waveform diagrams to illustrate the generation of a switching control signal according to an embodiment of the present invention. First referring to FIG. 9A, at time t1, setting signal SET transits from logic LOW to logic HIGH and phase detection module detects that clock signal CLK3 is the closest clock phase. At time t2, switching control signal PWM3 is set HIGH, and high-bits control signal HB3 transits to logic HIGH. Then referring to FIG. 9B, after a predetermined number of cycle periods, for example M cycle periods, and at time t3, at the leading edge of shifted phase clock signal CLK3, high-bits control signal HB3 transits from logic LOW to logic HIGH. At this time, the fractional control signal FR3 is in logic HIGH. In practice, fractional control signal FR3 may be controlled to transit from logic LOW to logic HIGH at any time between time t2 and time t3. At time t4, the leading edge of another shifted phase clock signal CLK4 comes, fractional control signal FR3 transits from logic HIGH to logic LOW. And switching control signal PWM3 transits from logic HIGH to logic LOW. Thus on time period of switching control signal PWM3 To=Th+Tf, where Th is the time when signal HB3 is in logic HIGH. Th=M*T, and Tf=1/5*T. Thus To=(M+1/5)*T. In other embodiments, if on time period To=(M+2/5)*T, then fractional control signal FR3 for PWM3 is generated based on shifted phase clock signal CLK5; if on time period To=(M+3/5)*T, then the fractional control signal FR3 for PWM3 is generated based on shifted phase clock signal CLK1; if on them period To=(M+4/5)*T, then the fractional control signal FR3 for PWM3 is generated based on shifted phase clock signal CLK2.

Figure 10:
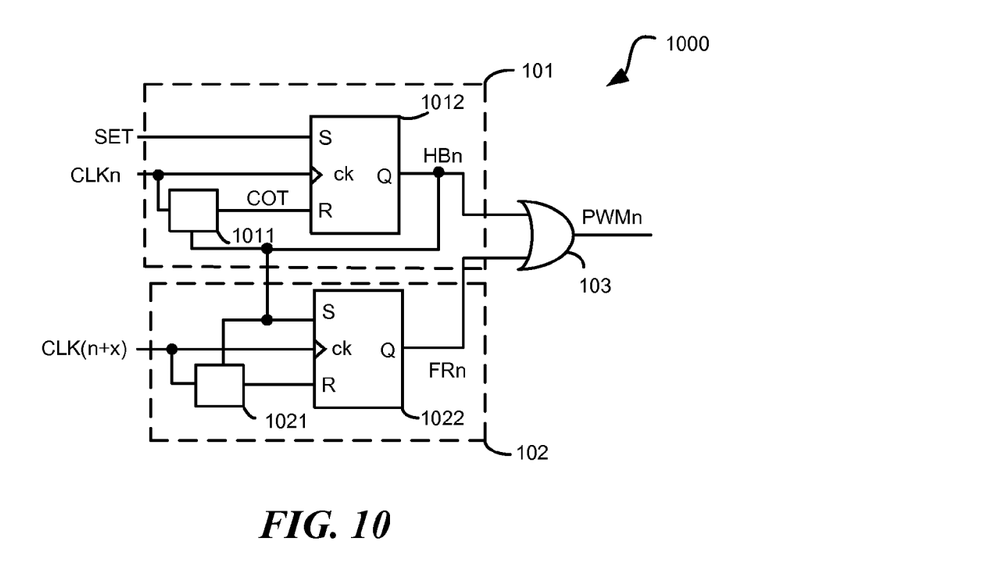
FIG. 10 illustrates a control signal generator 1000 according to an embodiment of the present invention.

FIG. 10 illustrates a control signal generator 1000 according to an embodiment of the present invention. Control signal generator 1000 comprises a high-bits control signal generator 101, a fractional control signal generator 102 and a logic circuit 103. High-bits control signal generator 101 has a first input receiving a setting signal SET, has a second input receiving a shifted phase clock signal CLKn, and has an output providing a high-bits control signal HBn. Fractional control signal generator 102 has a first input coupled to the output of high-bits control signal generator 101 to receive the high-bits control signal HBn, has a second input receiving a second shifted phase clock signal CLK(n+x) if n+x≤N, or CLK(n+x−N) if n+x>N, and has an output providing a fractional control signal FRn. Logic circuit 103 receives the high-bits control signal HBn and fractional control signal FRn, and generates switching control signal PWMn.

In the shown embodiment, high-bits control signal generator 101 comprises a timer 1011 and an RS flip-flop 1012. RS flip-flop 1012 has a set input S receiving setting signal SET, a reset input R receiving signal COT, a timing input ck receiving shifted phase clock signal CLKn, and an output providing high-bits control signal HBn. Timer 1011 has a first input receiving shifted phase clock signal CLKn, has a second input coupled to the output of RS flip-flop 1012, and has an output providing a high-bits on time control signal COT. When setting signal SET is in effective state of logic HIGH and at the leading edge of clock signal CLKn, high-bits control signal HBn transits from ineffective state of logic LOW to effective state of logic HIGH. And at the same time, timer 1011 starts to count from zero. At each leading edge of clock signal CLKn, timer 1011 adds on 1, and when the counted cycle period reaches a predetermined number M, timer 1011 overflows and signal COT generated by timer 1011 transits to effective state of logic HIGH and high-bits control signal HBn transits to ineffective state of logic LOW. Fractional control signal generator 102 comprises a timer 1021 and an RS flip-flop 1022. RS flip-flop 1022 has a set input S, a reset input R, a timing input ck, and an output. Wherein the setting input S receives high-bits control signal HBn. The timing input ck receives shifted phase clock signal CLK(n+x). And the output of RS flip-flop 1022 provides the fractional control signal FRn. Timer 1021 has a first input receiving shifted phase clock signal CLK(n+x), has a second input coupled to the output of RS flip-flop 1012, and has an output coupled to the reset input R of flip-flop 1022. When high-bits control signal HBn transits to logic HIGH, fractional control signal FRn transits to logic HIGH, and timer 1021 starts to count from 0. And at each leading edge of shifted phase clock signal CLK(n+x), timer adds on 1. And when the counted number reaches a predetermined number M, the output of timer 1021 transits to logic HIGH, and fractional control signal FRn transits to logic LOW. Logic circuit 103 comprises an OR gate, and when either of high-bits control signal HBn or fractional control signal FRn is in logic HIGH, switching control signal PWMn is in logic HIGH.

In another embodiment, fractional control signal generator 102 may comprise an RS flip-flop which has a set input receiving high-bits control signal HBn, has a reset input receiving shifted phase clock signal CLK(n+x), and without a timing input. And when signal HBn transits from logic HIGH to logic LOW, the RS flip-flop of fractional control signal generator is set HIGH, and at the next pulse of shifted phase clock signal CLK(n+x), fractional control signal FRn transits from logic HIGH to logic LOW to turn off the corresponding switch.

In the shown embodiment in FIG. 10, high-bits control signal generator 101 has the phase detection function and may deemed as comprising a phase detection module.

Figure 11:
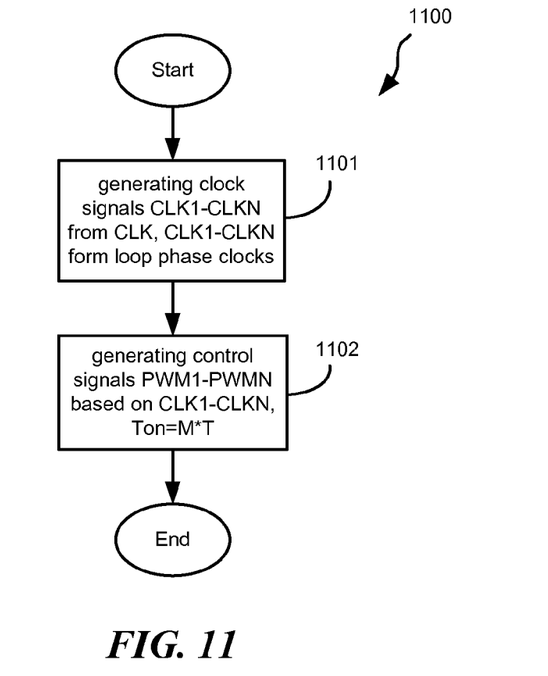
FIG. 11 illustrates a method 1100 of controlling a multi-phase SMPS according to an embodiment of the present invention.

FIG. 11 illustrates a method 1100 of controlling a multi-phase SMPS according to an embodiment of the present invention. The method comprises at a first step 1101 generating a plurality of shifted phase clock signals CLK1-CLKN from a system clock signal CLK. The number N of the shifted phase clock signals is the same with the number of the switching circuits in the multi-phase SMPS. The shifted phase clock signals CLK1-CLKN have the same frequency with the system clock signal CLK and form loop phase clocks. In one embodiment, the phase differences between any two adjacent shifted phase clock signals, for example CLKn and CLK(n+1), where n is a natural number less than N, or CLKN and CLK1, are the same, or in other words, the phases of the shifted phase clock signals are evenly dispersed, for example, for a 5-phase SMPS, the phases for 5 shifted phase clock signals are 0°, 72°, 144°, 216° and 288°. In one embodiment, one of the shifted phase clock signals has the same shape with the system clock signal, which means N−1 shifted phase clock signals are generated according to the system clock signal, and the N−1 shifted phase clock signals and the system clock signal form loop phase clocks. The method further comprises in step 1102 generating a plurality of switching control signals PWM1-PWMN based on the plurality of shifted phase clock signals CLK1-CLKN. Each switching control signal PWMn transits from a first logic state to a second logic state when a condition for example a setting signal in an effective state is sampled by the corresponding shifted phase clock signal at the time when the corresponding shifted phase clock signal CLKn transits from an ineffective state to an effective state. And then the switching control signal PWMn transits from the second logic state to the first logic state after a period of time. The period of time Ton=M*T, where M is a natural number and T is the period of system clock signal.

Figure 12:
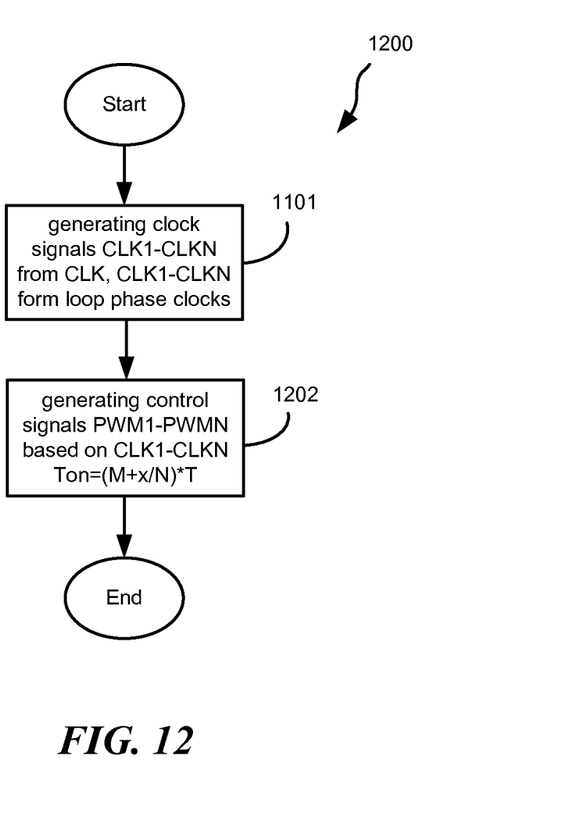
FIG. 12 illustrates a method 1200 of controlling a multi-phase SMPS according to another embodiment of the present invention.

FIG. 12 illustrates a method 1200 of controlling a multi-phase SMPS according to another embodiment of the present invention. Where in step 1202 the period of time Ton=(M+x/N)*T, where N is the number of switching circuit in the SMPS, and x is a natural number less than N. The rest parts of method 1200 are the same with those in method 1100.

According to some embodiments of the present invention, a controller may have the same transition time and same resolution as the approach whose resolution is determined by cycle period T of system clock signal, but the system clock signal is 1/N the frequency, which means much lower power consumption, less chip process technology requirement, and less area.

It is noted that an effective state of a logic signal, such as the clock signal, the setting signal, the on time control signal, the switching control signal may be in logic HIGH, or be in logic LOW, and an ineffective state is the converse of the effective state.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A multi-phase Switching Mode Power Supply (SMPS), comprising:
   N switching circuits, each switching circuit comprising a switch, wherein the N switching circuits are coupled to an output terminal configured to provide an output voltage for supplying a load, where N is a natural number greater than 1;
   a setting signal generator having an input coupled to the output terminal and having an output configured to provide a setting signal, wherein the setting signal is generated according to a feedback signal indicative of an output signal at the output terminal;
   a clock signal generator having an output configured to provide a system clock signal; and
   a controller having a first input coupled to the output of the setting signal generator configured to receive the setting signal, a second input coupled to the output of the clock signal generator configured to receive the system clock signal, and N outputs configured to provide N switching control signals, wherein each of the respective switching control signals is configured to control a corresponding switching circuit of the N switching circuits, and wherein the controller is configured to generate N shifted phase clock signals according to the system clock signal, and wherein the N shifted phase clock signals have the same frequency with the system clock signal and form a set of loop phase clocks, and further wherein the N switching control signals are generated based on the setting signal and the N shifted phase clock signals, wherein when the setting signal is in an effective state and a shifted phase clock signal of the N shifted phase clock signals transits from a first state to a second state, a corresponding switching control signal of the N switching control signals transits from a first logic state to a second logic state, and the corresponding switching control signal transits from the second logic state to the first logic state after a time period.

2. The multi-phase SMPS of claim 1, wherein the feedback signal is indicative of the output voltage.

3. The multi-phase SMPS of claim 1, wherein the setting signal generator comprises a comparing circuit, and wherein the comparing circuit is configured to compare the feedback signal to a reference signal and to generate the setting signal according to the comparison result.

4. The multi-phase SMPS of claim 1, wherein the clock signal generator comprises an oscillator, and the controller comprises a loop phase circuit, and wherein the loop phase circuit has an input coupled to the oscillator configured to receive the system clock signal and has N outputs configured to provide the N shifted phase clock signals.

5. The multi-phase SMPS of claim 1, wherein the controller comprises N control signal generators, wherein each control signal generator has a first input configured to receive the setting signal, a second input configured to receive a corresponding shifted phase clock signal of the N shifted phase clock signals, and an output configured to provide a corresponding switching control signal of the N switching control signals.

6. The multi-phase SMPS of claim 5, wherein each of the N control signal generators comprises:
   an on time signal generator configured to provide an on time control signal indicative of a time period; and
   an RS flip-flop having a first input configured to receive the setting signal, a second input configured to receive the on time control signal, a timing input configured to receive a corresponding shifted phase clock signal of the N shifted phase clock signals, and an output configured to provide a corresponding switching control signal of the N switching control signals, wherein when the setting signal is in an effective state and the corresponding shifted phase clock signal transits from an ineffective state to an effective state, the corresponding switching control signal transits from a first logic state to a second logic state, and wherein when the on time control signal transits from an ineffective state to an effective state, the corresponding switching control signal transits from the second logic state to the first logic state.

7. The multi-phase SMPS of claim 6, wherein the on time signal generator comprises a timer, wherein:
   when the corresponding switching control signal transits from the first logic state to the second logic state, the timer starts to count and the on time control signal transits from the effective state to the ineffective state, and then the timer counts the cycles of the shifted phase clock signal; and
   when the timer reaches a predetermined value, the on time control signal transits from the ineffective state to the effective state.

8. The multi-phase SMPS of claim 1, wherein the controller comprises N control signal generators, wherein each control signal generator has a first input configured to receive the setting signal, a second input configured to receive a corresponding shifted phase clock signal of the N shifted phase clock signals, a first output configured to provide a corresponding switching control signal of the N switching control signals, and a second output configured to provide another shifted phase clock signal with a shifted phase to another control signal generator of the N control signal generators.

9. The multi-phase SMPS of claim 1, wherein the time period equals $M*T$, where M is a natural number and T indicates a cycle period of the system clock signal.

10. The multi-phase SMPS of claim 1, wherein the time period equals $(M+x/N)*T$, where M is a natural number, x is a natural number less than N, and T indicates a cycle period of the system clock signal.

11. The multi-phase SMPS of claim 10, wherein the controller comprises N control signal generators, wherein each control signal generator comprises:
   a high-bits control signal generator having a first input configured to receive the setting signal, a second input configured to receive a corresponding shifted phase clock signal of the N shifted phase clock signals, and an output configured to provide a high-bits control signal;
   a fractional control signal generator having a first input configured to receive the high-bits control signal, a second input configured to receive another shifted phase control signal of the N shifted phase clock signals, and an output configured to provide a fractional control signal; and
   a logic circuit having a first input configured to receive the high-bits control signal, a second input configured to receive the fractional control signal, and an output configured to provide a corresponding switching control signal of the N switching control signals.

12. The multi-phase SMPS of claim 1, further having an input terminal configured to receive an input voltage and a ground terminal coupled to a reference ground, wherein each switching circuit comprises:
- a corresponding switch coupled between the input terminal and a switching node;
- a rectifier coupled between the switching node and the ground terminal; and
- an inductor coupled between the switching node and the output terminal.

13. A controller for controlling a multi-phase SMPS, the multi-phase SMPS comprising N switching circuits coupled to an output terminal configured to provide an output voltage for supplying a load, each switching circuit comprising a respective switch, the controller having:
- a first input configured to receive a setting signal;
- a second input configured to receive a system clock signal; and
- N outputs configured to provide N switching control signals;

wherein the controller is configured to generate N shifted phase clock signals according to the system clock signal, and wherein the N shifted phase clock signals have the same frequency with the system clock signal and the N shifted phase clock signals forming a set of loop phase clocks, and further wherein each switching control signal is configured to be generated at least based on the setting signal and a corresponding shifted phase clock signal of the N shifted phase clock signals and to control the corresponding switch, where N is a natural number greater than 1, wherein when the setting signal is in an effective state and a shifted phase clock signal of the N shifted phase clock signals transits from a first state to a second state a corresponding switching control signal of the N switching control signals transits from a first logic state to a second logic state, and the corresponding switching control signal transits from the second logic state to the first logic state after a time period.

14. The controller of claim 13, further comprising:
- a loop phase circuit having an input configured to receive the system clock signal and having N outputs configured to provide the N shifted phase clock signals; and
- N control signal generators, wherein each control signal generator has a first input configured to receive the setting signal, a second input configured to receive a corresponding shifted phase clock signal of the N shifted phase clock signals, and an output configured to provide a corresponding switching control signal of the N switching control signals.

15. The controller of claim 13, further comprising N control signal generators, wherein each control signal generator has a first input configured to receive the setting signal, a second input configured to receive a corresponding shifted phase clock signal of the N shifted phase clock signals, a first output configured to provide a corresponding switching control signal of the N switching control signals, and a second output configured to provide another shifted phase clock signal with a shifted phase to another control signal generator of the N control signal generators.

16. The controller of claim 13, wherein the time period equals $(M+x/N)*T$, where M is a natural number, x is a natural number less than N, and T indicates a cycle period of the system clock signal.

17. The controller of claim 13, further comprising N control signal generators, wherein each control signal generator comprises:
- a high-bits control signal generator having a first input configured to receive the setting signal, a second input configured to receive a corresponding shifted phase clock signal of the N shifted phase clock signals, and an output configured to provide a high-bits control signal;
- a fractional control signal generator having a first input configured to receive the high-bits control signal, a second input configured to receive another shifted phase control signal of the N shifted phase clock signals, and an output configured to provide a fractional control signal; and
- a logic circuit having a first input configured to receive the high-bits control signal, a second input configured to receive the fractional control signal, and an output configured to provide a corresponding switching control signal of the N switching control signals.

18. A method of controlling a multi-phase SMPS, the method comprising:
- generating N shifted phase clock signals from a system clock signal, wherein the shifted phase clock signals have the same frequency with the system clock signal and forming a set of loop phase clocks, and where N is natural number greater than 1; and
- generating N switching control signals based on the N shifted phase clock signals, wherein each switching control signal transits from a first logic state to a second logic state when a corresponding shifted phase clock signal of the N shifted phase clock signals samples a setting signal in an effective state, and the switching control signal transits from the second logic state to the first logic state after a period of time.

19. The method of claim 18, wherein the period of time equals $M*T$, where M is a natural number and T indicates a cycle period of the system clock signal.

20. The method of claim 18, wherein the period of time equals $(M+x/N)*T$, where M is a natural number, x is a natural number less than N, and T indicates a cycle period of the system clock signal.

* * * * *